Oct. 31, 1950 J. ZAGURSKI 2,527,613
DITCHER HITCH
Filed June 6, 1946 2 Sheets-Sheet 1
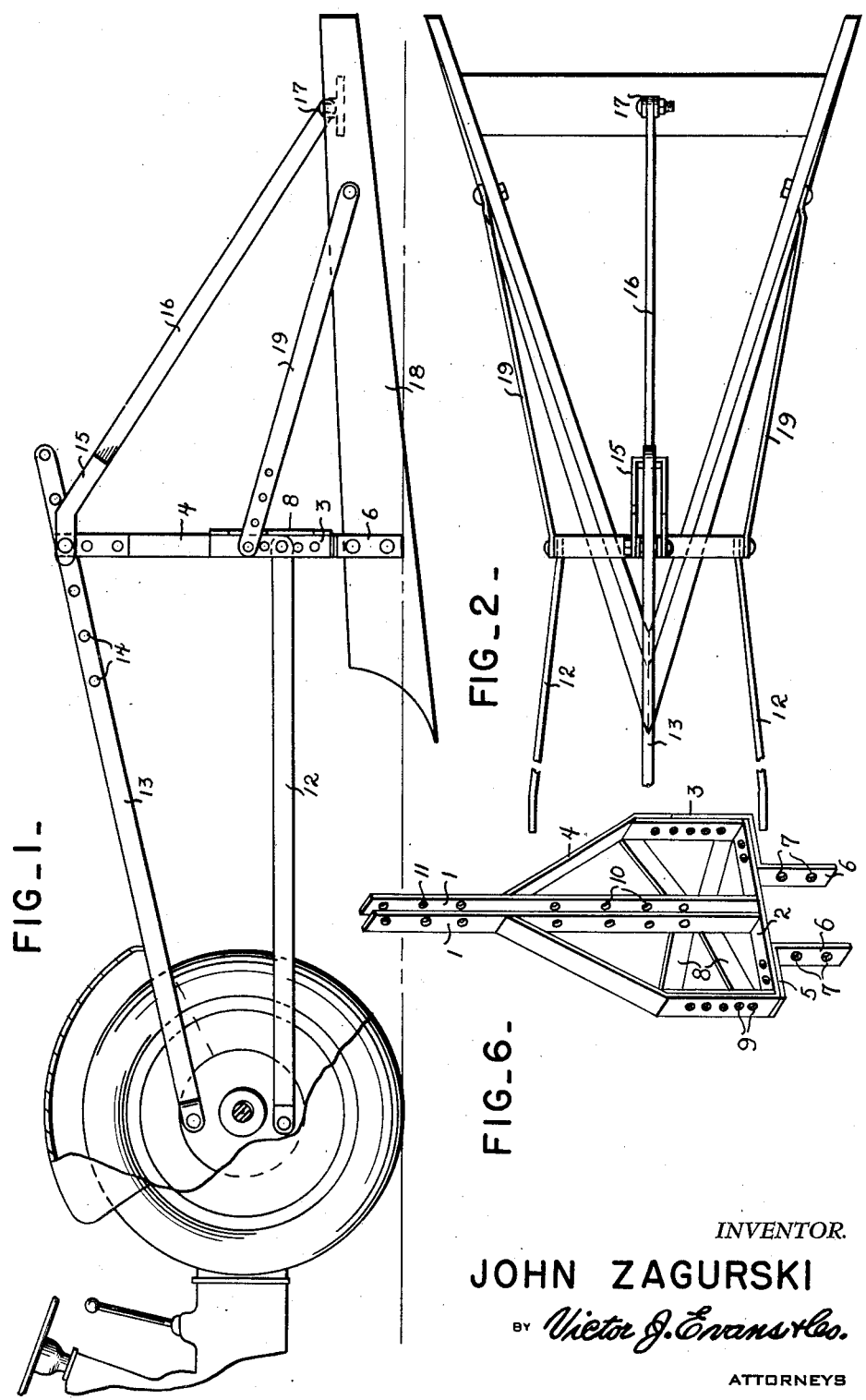
INVENTOR.
JOHN ZAGURSKI
BY *Victor J. Evans & Co.*
ATTORNEYS Oct. 31, 1950       J. ZAGURSKI       2,527,613
                    DITCHER HITCH
Filed June 6, 1946                  2 Sheets-Sheet 2
FIG_3_        FIG_4_     FIG_5_
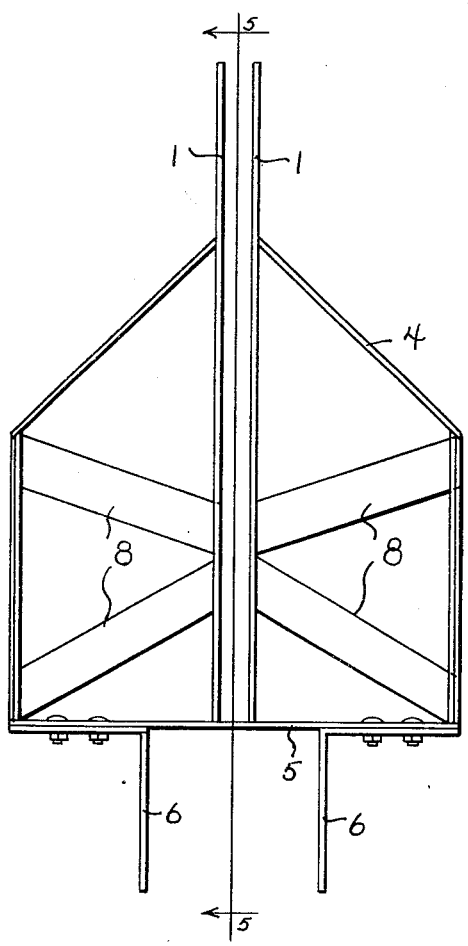
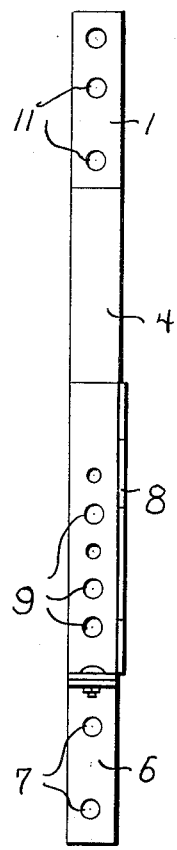
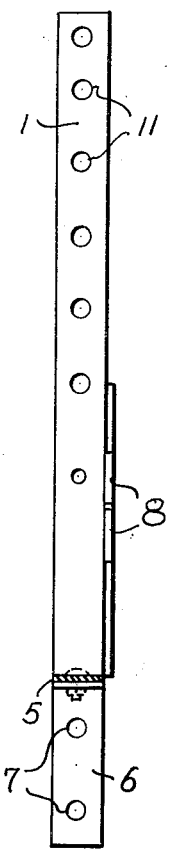
INVENTOR.
JOHN ZAGURSKI
BY *Victor J. Evans & Co.*
ATTORNEYS Patented Oct. 31, 1950

2,527,613

UNITED STATES PATENT OFFICE 2,527,613

DITCHER HITCH

John Zagurski, Williston, N. Dak.

Application June 6, 1946, Serial No. 674,807

1 Claim. (Cl. 97—47)

This invention relates to ditchers, and more particularly to improvements in hitches for ditchers.

In the irrigation of farm lands, it is necessary to make ditches of different depths for certain purposes. Such varying cuts for ditches, have, heretofore, been inconveniently made by manipulation of the ditcher.

It is an object of this invention to provide a hitch by means of which the ditcher can be adjusted to different angles to provide different cuts as may be desired.

A further object is the provision of a hitch which can be readily attached to a tractor and to a ditcher, and adjusted for varying depths of cut.

A further object is the provision of a rigid and strong frame in a hitch, capable of positively maintaining a ditcher at the proper angle.

These and other objects are attained by the novel construction and arrangement of parts hereinafter described and illustrated by the accompanying drawings, forming a part hereof, and in which:

Fig. 1 is a side elevational view of the hitch, showing the manner in which it is attached to a tractor and a ditcher.

Fig. 2 is a plan view of the hitch and ditcher.

Fig. 3 is a front elevational view of the hitch.

Fig. 4 is a side view of the hitch.

Fig. 5 is a sectional view taken on line 5—5 of Fig. 3.

Fig. 6 is a perspective view of the hitch.

Referring to the drawings, the hitch is shown to comprise a pair of bars 1 having their lower ends secured by welding or other suitable means to the base 2 of a U-shaped brace having upstanding legs 3 which have the upper portions 4 thereof bent inwardly and attached to the bars 1 also by welding or the like. Attached to the underside of base 2 are angles 5 having downturned sections 6, which are spaced from each other and have a plurality of holes 7. The U-shaped member is further secured to the bars 1 by brace bars 8, which are welded thereto.

The legs 3 are provided with a plurality of holes 9, and the bars 1 have a plurality of lower holes 10, and a plurality of upper holes 11, above the junction of portions 4 with the bars 1.

Bars 12 are connected to the tractor and secured by bolts through holes 9 to the legs 3; and a bar 13 having holes 14 is attached by a bolt through holes 11 to the upper end of bars 1. A bracket 15 secured by the same bolt passing through the holes 11 and 14 to the bars 1 has attached thereto a bar 16, which is pivotally connected at 17 to the rear end of the ditcher 18.

Bars 19 are connected to the sides of the ditcher 18 and to the legs 3 by bolts through the holes 9. The front end of the ditcher is connected to the hitch by bolts through the holes in sections 6.

To regulate the depth of cut the angle of the ditcher is adjusted by means of the selective positioning of the bolt in the holes 14 in bar 13 which is connected to the bar 1 by the bolt entering the holes 11 therein. The holes in bar 19, and holes 9 in legs 3, and the holes in the sections 6 enable further adjustments.

It will be seen that the hitch is of simple structure, having rigidity and strength and capable of being adjusted to change the angle of the ditcher to give various depths of cut in making irrigation ditches.

The above description is to be considered as illustrative and not limitative of the invention of which modifications can be made without departing from the spirt and scope of the appended claim.

The invention having been described, what is claimed is:

In a hitch for a ditcher, a U-shaped frame having a base, a pair of spaced parallel upstanding bars attached to the center of the base and to the upper portion of the legs of the frame and having a plurality of holes, a plurality of diagonally disposed braces attached to the bars and to the lower portion of the legs of the frame, a bar having a plurality of holes secured to the upper ends of said bars and adapted to be secured to a tractor, a bar attached to the upper end of the bars and adapted to be secured to the rear end of a ditcher, the legs of the frame having a plurality of holes, bars secured to the legs and adapted to be secured to the sides of a ditcher, bars secured to the legs and adapted to be secured to a tractor, and angles attached to the under side of the base of the frame, said angles having holes to enable it to be adjustably secured to the front end of a ditcher.

JOHN ZAGURSKI.

REFERENCES CITED

The following references are of record in the file of this patent:

UNITED STATES PATENTS

| Number | Name | Date |
|---|---|---|
| 2,309,750 | Carrington | Feb. 2, 1943 |
| 2,321,516 | Robertson | June 8, 1943 |
| 2,339,689 | Englund | Jan. 18, 1944 |
| 2,350,327 | Ender | June 6, 1944 |
| 2,352,466 | Arps | June 27, 1944 |